Nov. 20, 1923.
H. A. HOUSE, JR
WHEEL
Filed June 30, 1920
1,474,631
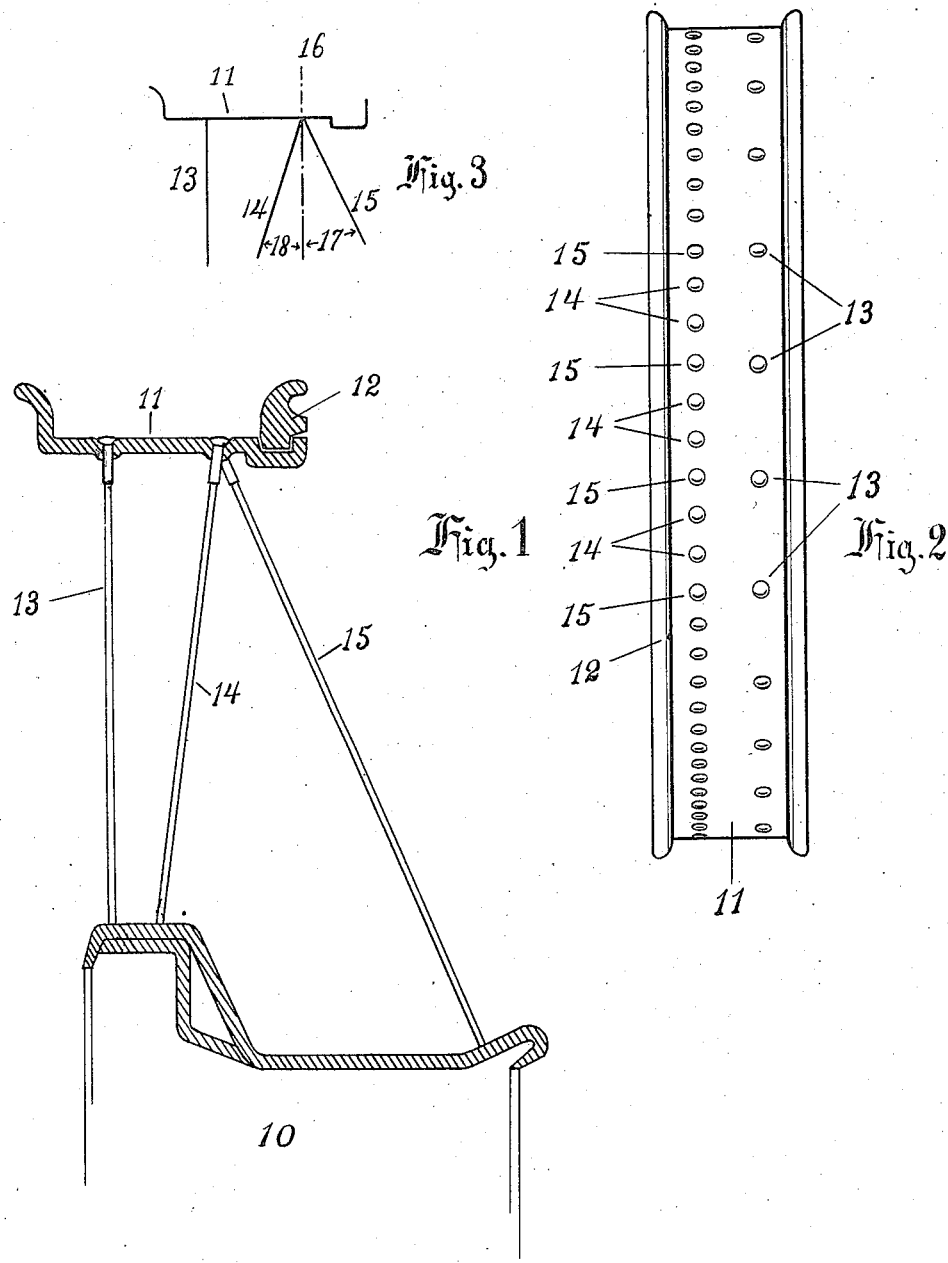
Inventor
Henry A. House Jr.
by
Clarence D Walker
Attorney Patented Nov. 20, 1923.

1,474,631

UNITED STATES PATENT OFFICE.

HENRY A. HOUSE, JR., OF BUFFALO, NEW YORK, ASSIGNOR TO WIRE WHEEL CORPORATION OF AMERICA, OF BUFFALO, NEW YORK, A CORPORATION OF NEW YORK.

WHEEL.

Application filed June 30, 1920. Serial No. 392,997.

*To all whom it may concern:*

Be it known that I, HENRY A. HOUSE, Jr., a citizen of the United States, and resident of Buffalo, Erie County, State of New York, have invented certain new and useful Improvements in Wheels, of which the following is a specification.

This invention relates to an improvement in wheels and particularly to wheels of the wire spoked type.

Wheels of this type comprise a hub, a rim and a plurality of spokes all under tension extending from the hub to the rim. When such wheels are symmetrical, that is to say, when the center plane of the rim passes through the center of the hub, two sets of spokes are customarily used extending one from each end of the hub at equal angles to the rim. The number of spokes in each set is the same, and, since they meet the rim at the same angle, they are under the same tension, the pull of one set exactly counteracting the pull of the other set. Such spokes not only kept the rim in proper position and resisted any side shock but also acted to transmit driving and braking strains.

Such wheels are still used in great numbers but it has been found necessary in applying wire wheels to motor vehicles to offset the rim so that the center plane is much nearer the inner end of the hub than the outer end. There are two main reasons for such offsetting, first, to resist the greater forces from the outside by increasing the slope of the outer set of spokes; and second, to permit the substitution of wire spoked wheels for wood wheels of the artillery type without increasing the tread of the vehicle.

This requirement resulted in the invention of what is generally known as the triple spoked wheel. In such a wheel the two sets of spokes used in the symmetrical wheel are retained but the inner set is practically vertical and has little or no function to counteract the pull of the outer set, which becomes greater by reason of its increased slope. A third set of spokes was therefore provided extending from the inner end of the hub to a circle adjacent to the outer edge of the rim at or near the circle to which the outer set of spokes extends. The new set of spokes and the outer set pull against each other to hold the rim in place while the inner set acts to transmit the driving and braking forces.

One object of this invention is to provide a wire wheel having driving and braking spokes and two sets of tension spokes for resisting side strains, all of the spokes in such sets being under the same tension.

Other objects will appear from an examination of the specification and of the drawings which form a part thereof and in which—

Fig. 1 is a cross sectional view of a wire wheel built according to this invention;

Fig. 2 is a plane view of the rim of such a wheel; and

Fig. 3 is a diagrammatic view showing the angular relationship of the two sets of tension spokes with the rim.

Referring to the drawings, the numeral 10 indicates the hub of a wheel having a rim 11 provided with a rim ring 12 for holding the tire (not shown) in place. Connecting the hub and rim are the driving and braking spokes 13 and two sets of tension spokes, 14, 15, and set 14 extending from the outer end of the hub to the outer portion of the rim and the set 15 extending from the inner end of the hub to the outer portion of the rim. For convenience these spokes are shown meeting the rim in the same circle but obviously this is not necessary for the perfecting of this invention.

In Fig. 3 the line 16 designates the line of a plane passing through the rim circle. The outer set 15 makes an angle 17 with the line 16 while the inner set 14 makes an angle 18. It will be noted that the angle 17 is larger than the angle 18 in fact it is shown in Fig. 3 as twice as large. A pull in the direction of set 15 would, therefore have double the effect of an equal pull in the direction of set 14. If therefore, there were the same number of spokes in set 14 as in set 15 the spokes in the former would necessarily be under twice the tension of the spokes in the latter set in order to keep the rim in position.

The difference in tension is one reason for the snapping of spokes commonly called "spoke breakage" and to avoid it many different methods have been tried, such as increasing the number of sets and changing the point of contact of the spokes at the rim.

I have, however, eliminated this difficulty by increasing the number of spokes in set 14 until that number bears the same relation to the number in set 15 as the angle of set 15 at the rim bears to the angle of set 14 at the rim.

Since, in the drawing, angle 17 is twice angle 18, I have provided twice as many spokes in set 14 as in set 15.

Although one embodiment only of this invention has been shown and described, it is obvious that other embodiments may be made without departing from the spirit and scope of this invention as set forth in the following claims.

I claim—

1. A wire wheel comprising a hub, a rim and spokes extending from said hub to said rim, said spokes being arranged in three sets, the first set extending from the outer end of the hub to the rim, the second set extending from the inner end of the hub to the rim, both said sets meeting the rim at an angle, the angle of the first set bearing the same ratio to the angle of the second set as the number of spokes in the second set bears to the number of spokes in the first set and the third set of spokes meeting the rim at substantially right angles thereto functioning as driving and braking spokes extending from the hub to the rim.

2. A wire wheel of the type set forth in claim 1, in which the angle of the first set to the rim is twice that of the second set to the rim and in which there are twice as many spokes in the second set as in the first set.

In testimony whereof I affix my signature.

HENRY A. HOUSE, JR.